United States Patent
Fitch et al.

(10) Patent No.: US 11,271,324 B2
(45) Date of Patent: Mar. 8, 2022

(54) COVER FOR A PIT

(71) Applicant: BRITISH TELECOMMUNICATIONS PUBLIC LIMITED COMPANY, London (GB)

(72) Inventors: Michael Fitch, London (GB); Paul Putland, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 17/250,381

(22) PCT Filed: Jun. 14, 2019

(86) PCT No.: PCT/EP2019/065687
§ 371 (c)(1),
(2) Date: Jan. 13, 2021

(87) PCT Pub. No.: WO2020/015938
PCT Pub. Date: Jan. 23, 2020

(65) Prior Publication Data
US 2021/0249785 A1    Aug. 12, 2021

(30) Foreign Application Priority Data
Jul. 16, 2018    (EP) .................................. 18183790

(51) Int. Cl.
*H01Q 21/00* (2006.01)
*E02D 29/14* (2006.01)
(Continued)

(52) U.S. Cl.
CPC ......... *H01Q 21/0075* (2013.01); *E02D 29/14* (2013.01); *H01Q 1/48* (2013.01); *H01Q 9/045* (2013.01); *H04B 7/145* (2013.01)

(58) Field of Classification Search
CPC .......... H01Q 1/38–1/48; H01Q 9/0407; H01Q 21/0075; H01Q 21/00–21/26; H04B 7/145
See application file for complete search history.

(56) References Cited

U.S. PATENT DOCUMENTS

| | | | |
|---|---|---|---|
| 5,583,492 A | 12/1996 | Nakanishi et al. | |
| 5,659,300 A | 8/1997 | Dresselhuys et al. | |

(Continued)

FOREIGN PATENT DOCUMENTS

| | | | |
|---|---|---|---|
| CN | 106058428 A | 10/2016 | |
| EP | 2187174 A1 | 5/2010 | |

(Continued)

OTHER PUBLICATIONS

Extended European Search Report for Application No. 18183790.7, dated Jan. 23, 2019, 9 pages.

(Continued)

*Primary Examiner* — Hasan Islam
(74) *Attorney, Agent, or Firm* — Patterson Thuente Pedersen, P.A.

(57) ABSTRACT

A passive radio repeater is built into a cover for a pit, in order to relay radio signals between a base station and a wireless communications device such as a water meter at the bottom of the pit. Within the external surface of the lid are provided upper and lower patch antennas. The lower antenna has a radiation pattern that extends downwards at right-angles to the plane of the lid, so that it communicates with the device at the bottom of the pit. The top antenna has a directional beam pattern in the elevation plane, achieved by exciting the top antenna in a mode that is higher than fundamental. The two antennas are coupled by a stripline printed circuit board provided with feeds to generate the required beam patterns.

11 Claims, 6 Drawing Sheets

(51) Int. Cl.
*H01Q 1/48* (2006.01)
*H01Q 9/04* (2006.01)
*H04B 7/145* (2006.01)

(56) References Cited

U.S. PATENT DOCUMENTS

| | | | |
|---|---|---|---|
| 6,072,405 | A | 6/2000 | Sears |
| 6,218,995 | B1 | 4/2001 | Higgins |
| 11,056,761 | B2* | 7/2021 | Schlosser .............. H01Q 1/2233 |
| 2010/0328186 | A1* | 12/2010 | Kanno ................... H01Q 3/46 |
| | | | 343/872 |
| 2014/0184455 | A1* | 7/2014 | Lea ...................... H01Q 21/065 |
| | | | 343/745 |
| 2017/0015591 | A1 | 1/2017 | Mortier et al. |
| 2017/0155191 | A1 | 6/2017 | Kim et al. |
| 2018/0090841 | A1 | 3/2018 | McCarrick et al. |
| 2019/0280391 | A1* | 9/2019 | Sanjuan Flores ...... H01Q 19/17 |

FOREIGN PATENT DOCUMENTS

| | | | |
|---|---|---|---|
| GB | 2486675 | A | 6/2012 |
| WO | WO-2012113397 | A1 | 8/2012 |

OTHER PUBLICATIONS

Notification of Transmittal of the International Search Report and Written Opinion of the International Searching Authority for Application No. PCT/EP2019/065687, dated Jul. 9, 2019, 15 pages.
Search Report for Great Britain Application No. 1811634.3, dated Jan. 9, 2019, 4 pages.
Communication pursuant to Article 94(3) EPC for Application No. 19729568.6, dated Oct. 21, 2021, 5 pages.

* cited by examiner

COVER FOR A PIT

PRIORITY CLAIM

The present application is a National Phase entry of PCT Application No. PCT/EP2019/065687, filed Jun. 14, 2019, which claims priority from EP Patent Application No. 18183790.7, filed Jul. 16, 2018, each of which is hereby fully incorporated herein by reference.

TECHNICAL FIELD

This disclosure relates to an apparatus that enables better radio propagation into and out of a cavity or pit. Embodiments to be described are applied to a water meter boundary box to support "smart" metering using radio networks, but other applications are possible.

BACKGROUND

Utility meters, in particular water meters, for domestic and small commercial properties are usually positioned below ground level, accessible down a pipe or cavity that is 0.5 to 1 m deep, and protected by a cover or lid. In "smart metering" applications, a meter transmits its readings to a back-end server, for purposes such as monitoring and billing, using a wireless connection, either according to a predetermined schedule, under certain alarm conditions, or in response to a prompt transmitted from the billing center. For this purpose, the meter is fitted with a radio unit. Because of the limited space in such cavities the antennas associated with such units are usually very small, and incorporated in the meter itself, and are thus also towards the bottom of the cavity.

Radio signals to and from the meter suffer attenuation due to the antenna being small and being underground, so that the radio signals need to travel a significant distance through the ground and/or the pit lid. Furthermore, the transmit power from the radio unit is usually very restricted, as there is usually no electrical power supply to the water meter and so they are powered by batteries or the flow of water. Consequently, such a "smart" water meter can only operate effectively if there is a base station in close proximity. Increasing the number of base stations would not, in general, be a cost-effective solution.

It is known to use antennas located at ground level, at the top of the meter cavity, to improve the radio signal. These may be connected by wire to the meter itself, but this can be inconvenient and risks damage to the connections when the lid is removed. U.S. Pat. No. 6,072,405A describes a unit mounted on a pit lid, fitted with active electronics and a microprocessor. This requires a power supply. U.S. Pat. No. 6,218,995B1, describes an arrangement using capacitive coupling to extend radio coverage to underground metering units. Both of these require relatively expensive and delicate electronic equipment to be mounted in the pit lid, where it is vulnerable to mishandling if the lid is removed for access to the pit, or damage if large objects are dropped on the lid, or dragged or driven over it. It also makes the lids expensive, and complicated to replace because of the need to reconnect the electrical components.

It is also known to use an antenna embedded in the lid as a passive repeater. A passive repeater receives and re-transmits a signal without interpreting it, and without adding power. This is cheaper and easier to install, but as power is limited there may only be a small improvement, if any, in range if the antennas that it uses on the top and bottom are simple types with radiation patterns that extend at right-angles to the plane of the lid.

SUMMARY

According to the present disclosure, there is provided a pit lid comprising a repeater antenna configured to re-transmit radio signals in and out of the pit, and having upper and lower patch antennas coupled through a stripline, the upper patch antenna having a radiation pattern concentrated in an upward direction at a predetermined angle from the plane of the patch, and the lower patch antenna having a radiation pattern radiating in a downward direction generally perpendicular to the plane of the patch, and tuned to a waveguide dimensioned to form an aperture sized to accommodate the pit lid. The lower patch antenna can therefore be configured to be tuned to the dimensions of the pit it is to fit, such that the pit can act as a waveguide.

In some embodiments the upper antenna is excited using modes higher than fundamental. The stripline may be coupled to a ground plane and separated from the upper antenna by a dielectric, the dielectric having a plurality of apertures, and one or more via posts pass through the apertures to couple the ground plane to the upper antenna to induce the higher modes in the antenna.

In embodiments of the disclosure, the radiation pattern of the upper antenna is azimuthally symmetrical. In other embodiments, the pit lid has circular asymmetry, and the radiation pattern is configurable to be focused in a predetermined azimuth direction relative to the lid.

The upper patch antenna is preferably covered by a protective material having an unevenly shaped surface to deter placement on the lid of objects that would distort the transmissions of the upper patch antenna.

The disclosure also extends to a method of installation of an antenna assembly for relaying radio signals between a radio station located in a pit and a radio base station remote from the pit, comprising covering the pit with a pit lid according to the above aspects of the invention. On initial installation, an angular elevation of the base station may be measured from a position at the top aperture of the pit and, from a plurality of pit lids having radiation patterns concentrated at different predetermined elevation angles, a pit lid is selected having a radiation pattern corresponding to the elevation angle of the base station is selected for installation. A set of pit lids may be provided, having different radiation patterns, so that a user may select from the set a pit lid whose radiation pattern is most appropriate for the elevation of a base station with which communication is required. Pit lids with different radiation patterns may be differentiated by different shapes, to fit differently-shaped apertures selected according to the elevation of the base station, so that only the correct one can be installed, particularly so that replacement of a damaged lid can be performed simply.

An embodiment of the disclosure therefore provides a type of passive repeater with patch antennas in which the bottom antenna has a radiation pattern that extends at right-angles to the plane of the lid, but the top antenna has a directional beam pattern in the elevation plane and an omni-direction pattern in the azimuth plane. This type of pattern is achieved by exciting the top antenna in a mode that is higher than fundamental. The excitation of the bottom antenna can be fundamental mode or not, but fundamental mode is the most likely because it generates a radiation pattern that points straight down the pit towards the meter. The two antennas are coupled by a stripline printed circuit board that feeds them at the optimum point from the perspective of the patterns that they generate.

The passive repeater with the directional top antenna can harvest a radio signal received at ground level from a base station, and focus it down towards the water meter at the bottom of the pit covered by the lid. Better signal strength and quality can thus be achieved at the receiver, as the signal is transmitted through the air in the pit rather than through the ground. This reduces the number and/or power of radio gateways required to service the meters in a given area. The invention allows an existing lid to the boundary box to be replaced by a lid that contains coupled patch antennas, which enables the radio signal to better propagate into the bottom of the boundary box. The radiation pattern from the top antenna can be selected to suit the optimum elevation angle to the preferred base-station. This is achieved by selection of patch shape, for example square, circular or triangular, by forcing the presence of higher modes through shorting points, and by connecting the patch to the stripline at locations that excite it at the selected mode.

The considerations discussed above in relation to receiving radio signals from a base station apply equally, of course, to data transmitted in the reverse direction from the meter to the base station.

It may not be practical to make the necessary electrical connections on site when the lid is installed, and the result may not be sufficiently robust to withstand typical external conditions, so pit lids embodying the invention may be manufactured with a range of excitation patterns, the most appropriate one for the location being selected for installation, using modes higher than fundamental. This allows the antenna and its connections to be suitably protected from mishandling or damage from objects being dropped on the lid, or dragged or driven over it.

The embodiment to be described relates to water meter installations, but the disclosure is not limited to water meters, and may be used in any circumstances where radio signals are required to be transmitted from, or received at, an underground location.

BRIEF DESCRIPTION OF THE DRAWINGS

Embodiments of the disclosure will now be described, with reference to the drawings, in which.

DETAILED DESCRIPTION

Figure 1:
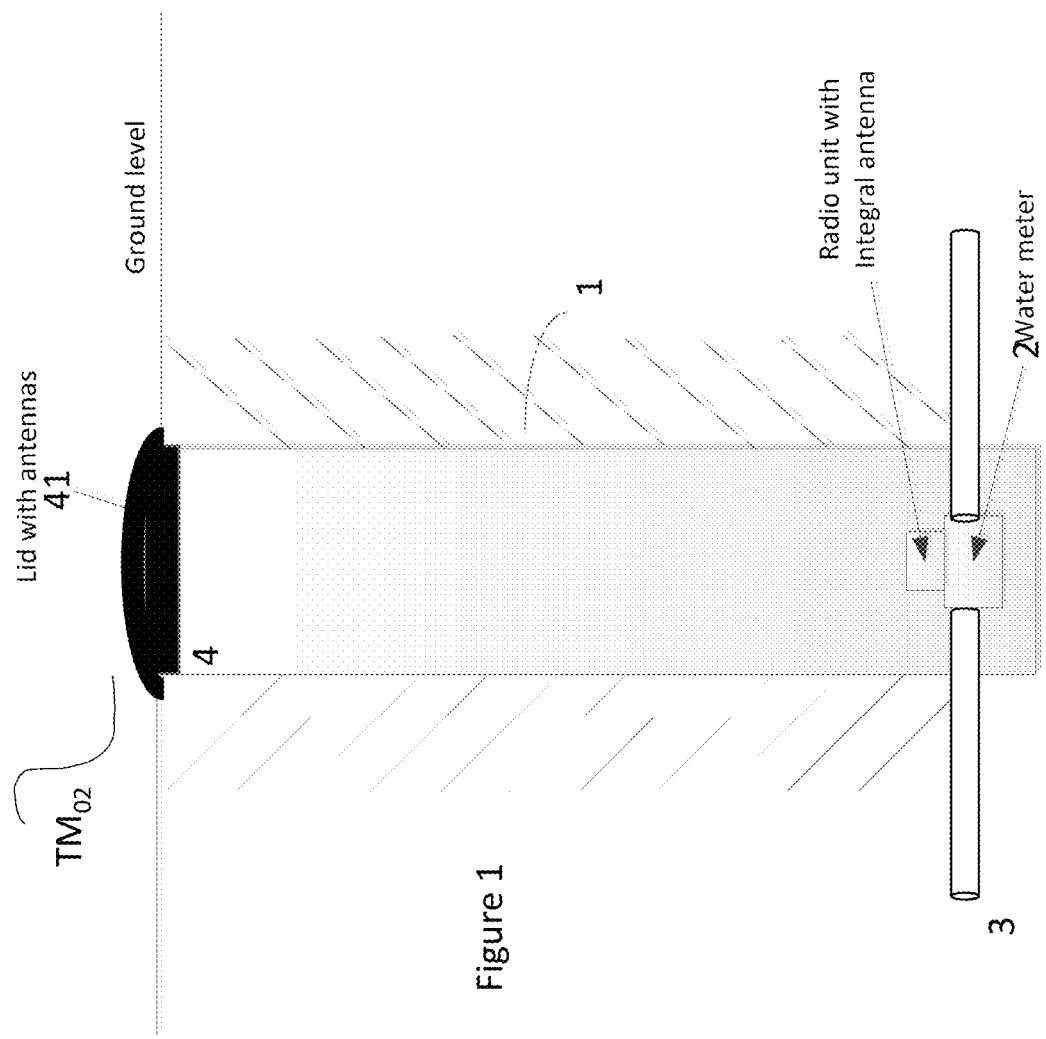
FIG. 1 is a schematic depicting a water meter in a pit, the pit being covered with a lid fitted with antennas.

FIG. 1 depicts a pit 1 at the bottom of which is a water meter 2 plumbed in to a supply pipe 3 in order to measure the flow of water in the pipe. Typically, this will be the water supply to commercial or domestic premises, which typically run about 1 meter below the ground to avoid disturbance to the pipes from activity on, or close underneath, the surface.

As shown in FIG. 1, a lid 4 is provided to close the top of the pit, in order to prevent objects falling into the pit, and to provide a smooth ground surface. According to embodiments of the disclosure, the lid also incorporates a repeater antenna system, which is depicted in detail in FIGS. 2 to 9.

Figure 2:
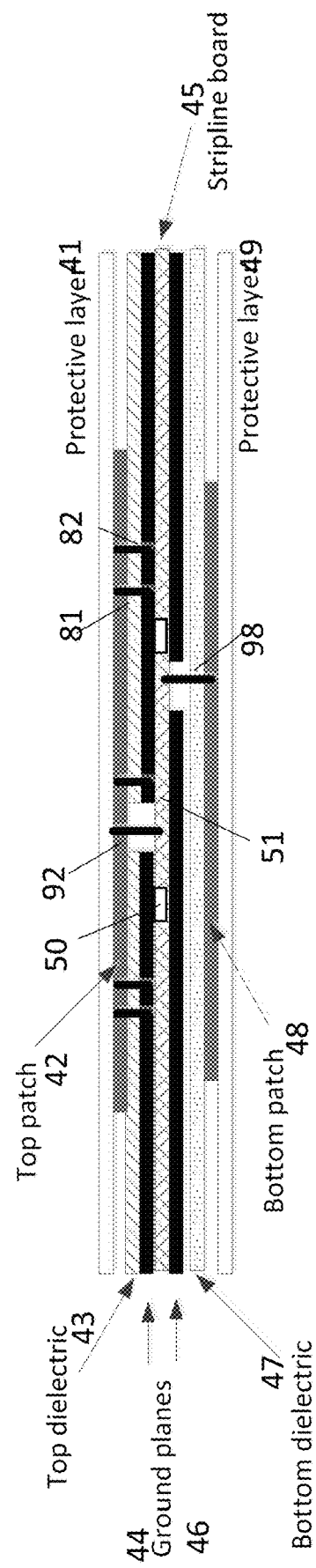
FIG. 2 depicts a cross section of a pit lid embodying the invention, in side elevation, showing the overall arrangement of layers in the lid.

FIG. 2 depicts a cross section of a pit lid embodying the disclosure, in side elevation, showing the overall arrangement of layers in the lid. Note that some of these layers may not be independent of each other, for example the ground planes and antennas might be made together using double-sided dielectric substrate.

The top and bottom layers 41, 49 are part of the external surface of the lid, which are made of suitable material to provide weatherproofing and protect the internal components of the lid. As access may be required from time to time, meter pits are usually located where it is unlikely that objects such as flower pots or dustbins will be placed over them, although, in the case of a conventional lid, such objects can be removed when access is required. However, if radio signals are to be transmitted or received remotely, when the pit is unattended, it is more important that nothing that could interfere with such signals is placed upon it. In order to prevent this, the upper surface 41 of the lid may be shaped to make it difficult to place an object on top of it, as shown in FIG. 1.

In any case, depending on its location, the lid may need to be strong enough to support the weight of people walking over it, or even of vehicles being driven over it.

Within the lid are two patch antennas 42, 48 facing respectively towards the upper and lower surfaces (41, 49) of the lid.

Figure 7:
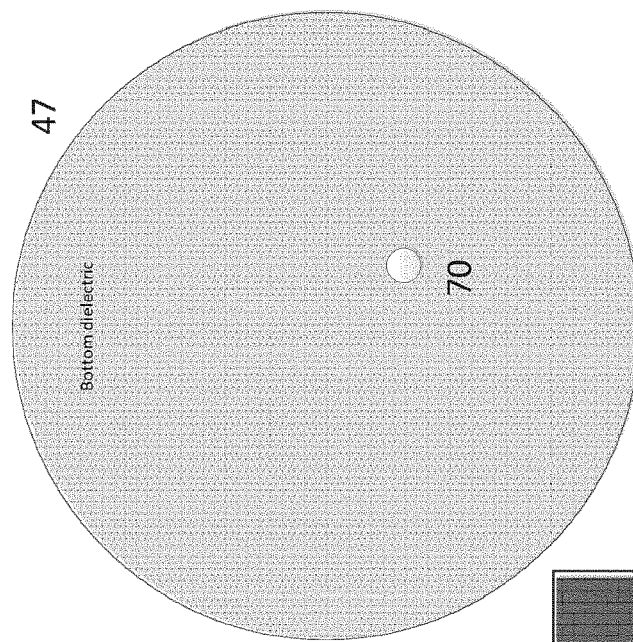
FIG. 7 is a plan view of a lower dielectric layer.
Figure 8:
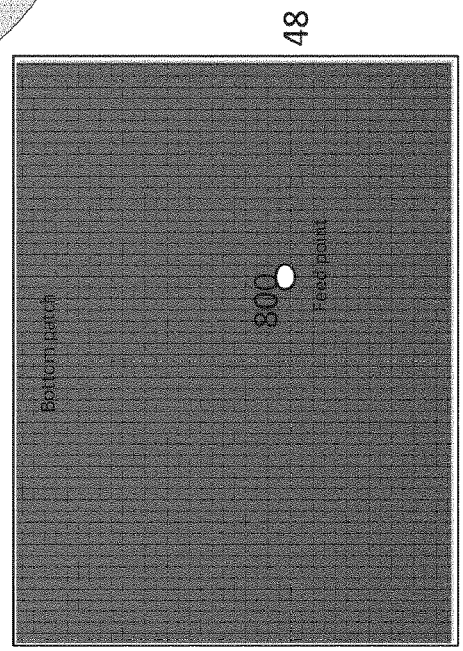
FIG. 8 is a plan view of a shows a bottom patch antenna.
Figure 6:
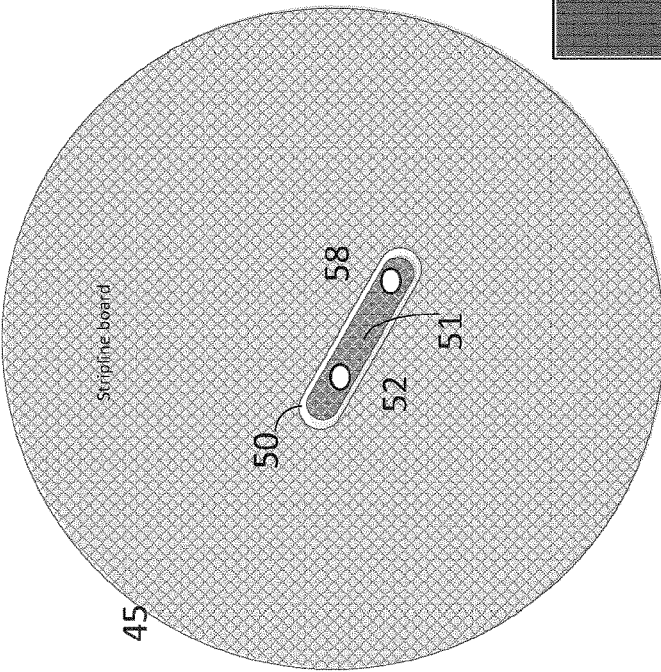
FIG. 6 is a plan view of a stripline printed circuit board.
Figure 9:
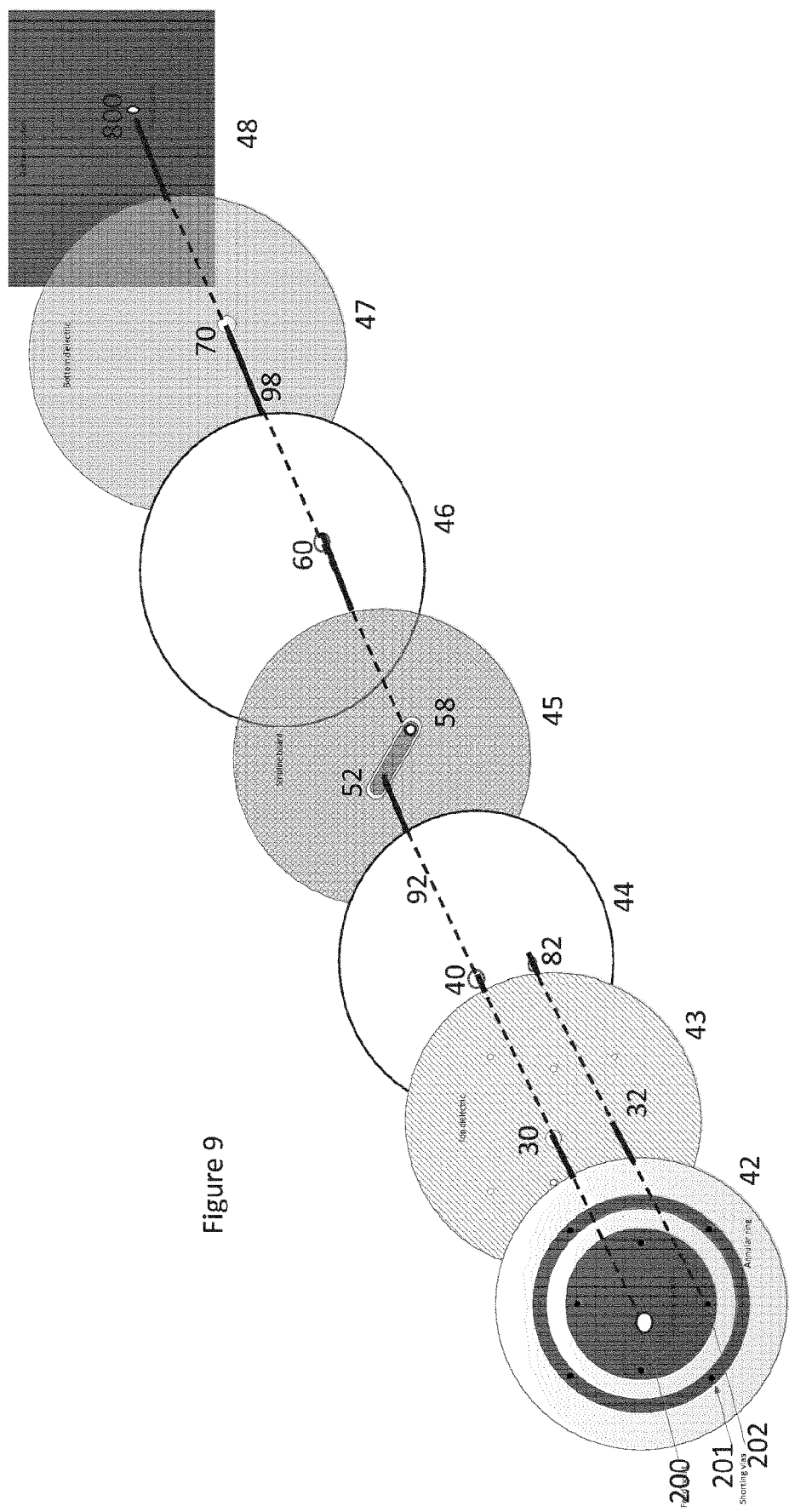
FIG. 9 depicts an assembly of the elements of FIGS. 4 to 8 in exploded view.

FIGS. 4 to 8 show some of the individual layers in the lid in more detail, and FIG. 9 shows the layers in exploded view.

Figure 3:
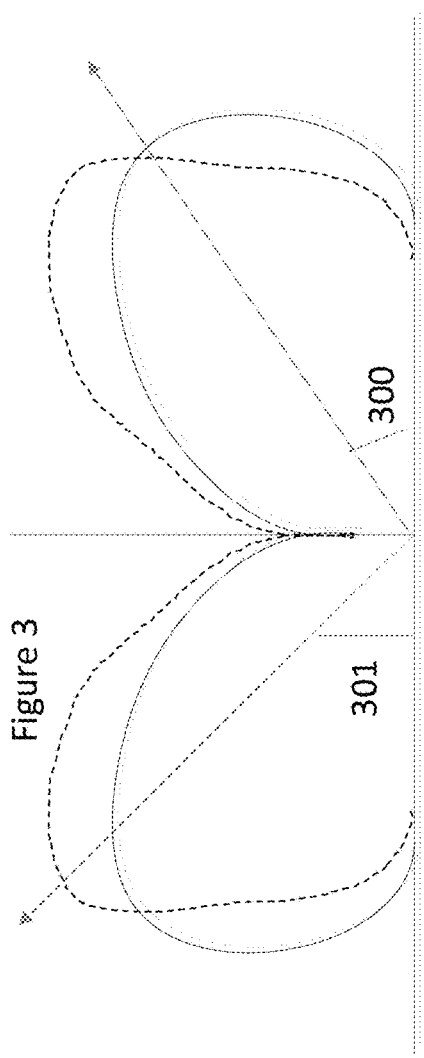
FIG. 3 depicts a radiation pattern in elevation plane.
Figure 4:
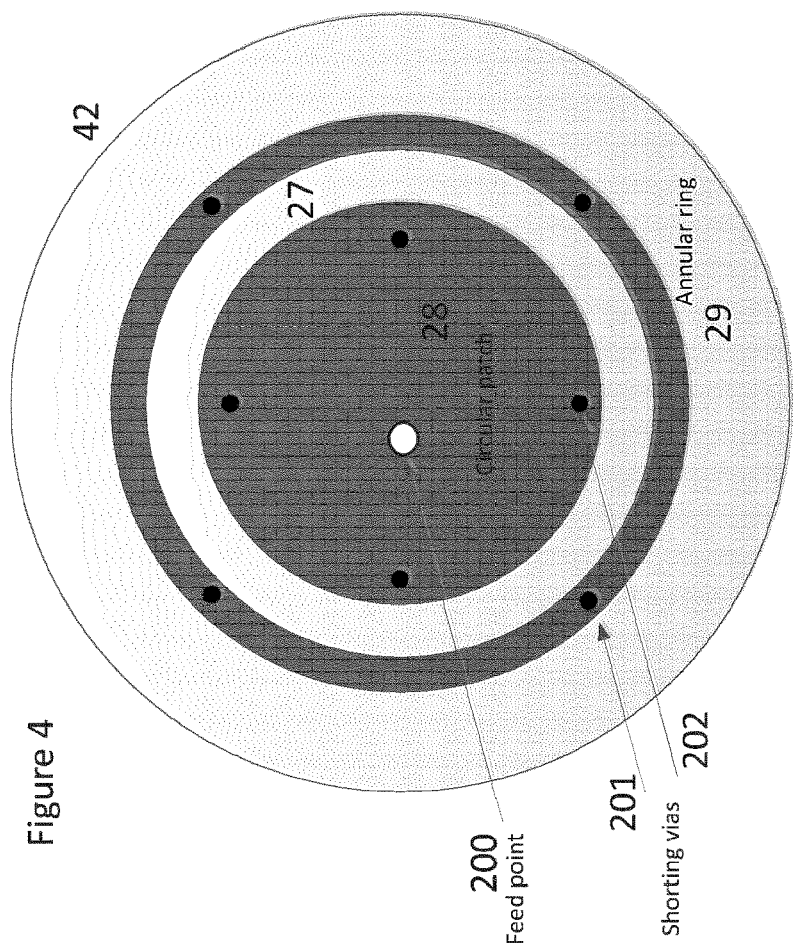
FIG. 4 is a plan view of a top patch antenna.

The top antenna 42 is shown in more detail in plan view in FIG. 4. It is used to communicate with base-stations. The radiation pattern of the antenna can be selected by suitable design of the antenna, in a manner known in the art. In this example the patch antenna comprises a central circular patch 28 and an outer annular ring 29. An annular gap 27 between the main patch and the annular ring prevents any magnetic field from being radiated in that region, and the shorting connections or vias 81, 82 control the electric field. Between them, the two mechanisms establish two wavelengths to exist across the antenna and hence the antenna is in second order mode. The radiation pattern of the upper patch 42 is depicted in FIG. 3, as seen in the elevation plane. The elevation angle 300 can be selected by exciting a patch antenna with higher than fundamental mode, for example $TM_{02}$ that can be achieved by putting shorting vias 81, 82 in appropriate points 201, 202 in the antenna patch, to connect to a ground plane 44 (FIG. 2), in addition to the fundamental feed point 200 or by using multiple feeds. Increasing the number of rings, gaps and vias will drive it to higher modes still, resulting in different elevation angles (e.g. 301 in FIG. 3) of the radiation pattern; and optimum elevation angle to a preferred base station can be selected accordingly.

Pit lids may therefore be manufactured with a range of excitation patterns, the most appropriate one for the location being selected for installation according to the angular elevation, as seen from the position of the lid, of the base station which is to co-operate with it.

Water meter pits are typically dug using an auger, resulting in a pit of circular cross section, and the lids covering such pits are, typically, also circular. It is therefore preferred to have a azimuthally symmetrical radiation pattern, in which case the lid can be placed in any orientation over the aperture but, as depicted in FIG. 3, having an elevation angle 300 selected according to that of the nearest base station.

The bottom patch antenna 48 is shown in more detail in FIG. 8 and will typically be fed in fundamental mode, through a feed post 98 connected to a suitably-placed feed point 800, which results in a radiation pattern that extends directly down into the pit. In this embodiment the lower antenna 48 has a single feed, and no shorting vias to the lower ground plane 46, and therefore operates in fundamental mode. Its radiation pattern is directly away from the patch at right-angles, so pointing directly down the pit towards the meter. It is also shown as a rectangular patch, but any shape can be used, including circular. A suitable combination of radio frequency and pit dimensions may allow the pit to act as a waveguide, improving the signal strength at the receiver.

Sandwiched in between the two antennas 42, 48 is a circuit or 'stripline' assembly 45 (shown in plan view in FIG. 6), which performs the function of coupling between the top and bottom antennas, in particular providing connections 52, 58 to a stripline track 51, connecting through respective feed posts 92, 98 to the respective feedpoints 200, 800 on the antennas 42, 48 and if necessary splitting and phasing the feeds between the antennas. More lines can be added if there are multiple feeds on either top or bottom antenna 42,48. There is an isolation gap 45 surrounding the stripline track 51.

Figure 5:
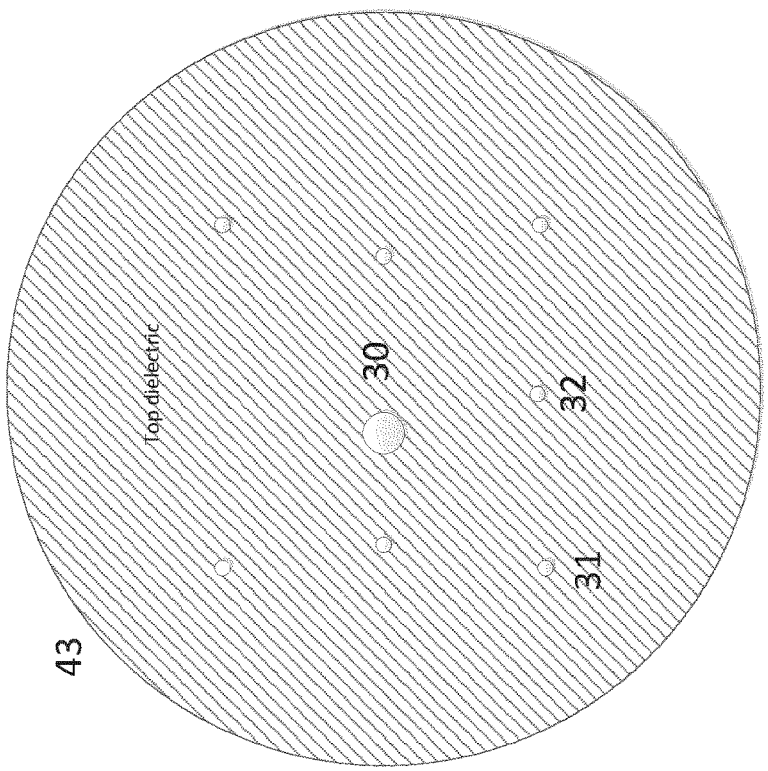
FIG. 5 is a plan view of an upper dielectric layer.
Figure 11:
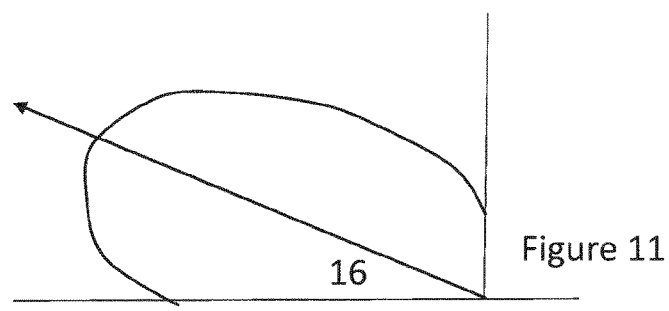
FIG. 11 depicts a radiation pattern in elevation plane.
Figure 10:
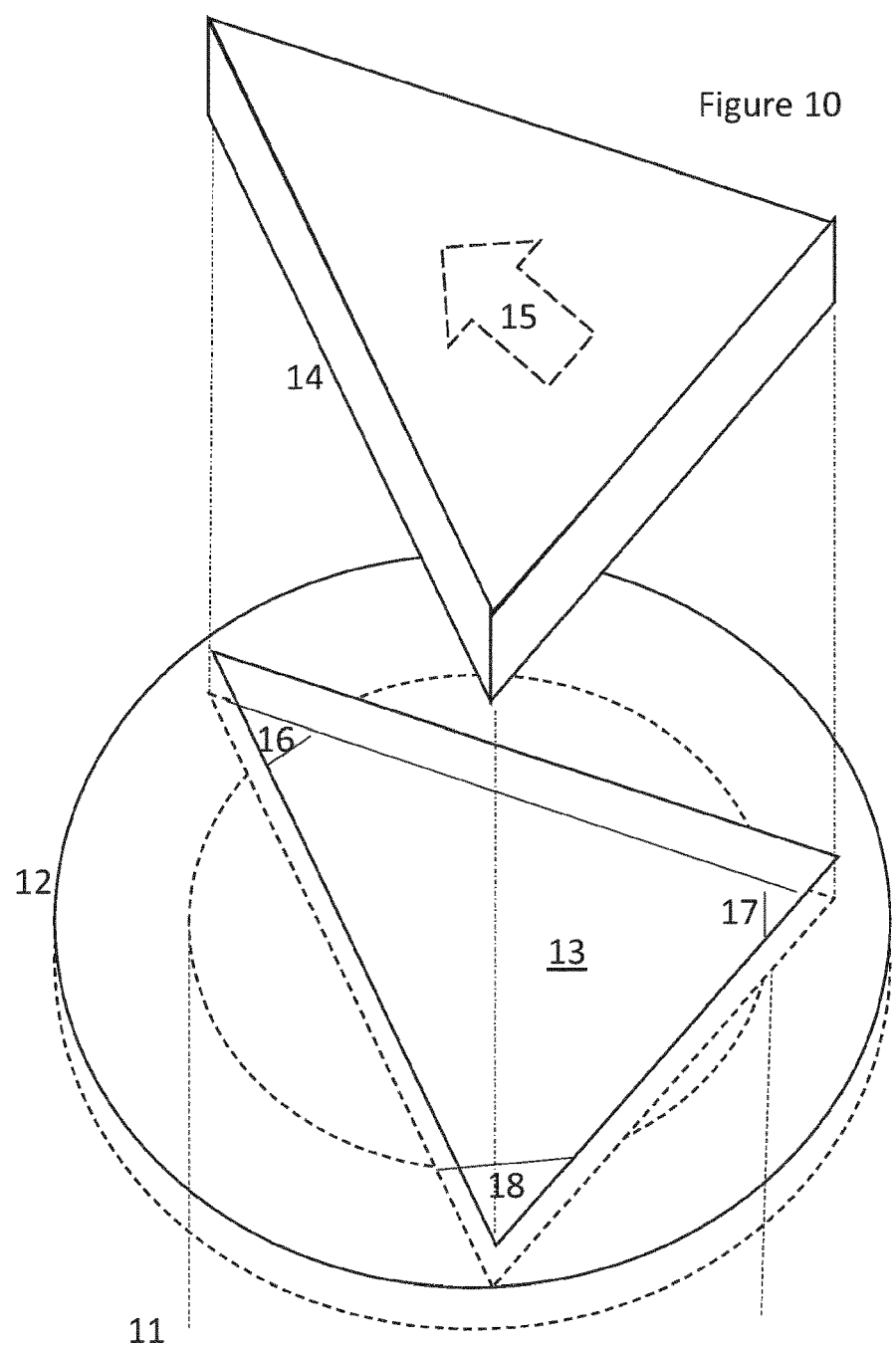
FIG. 10 depicts an alternative configuration of a pit and pit lid.

The patch antennas 42, 48 are spaced from the stripline assembly 45 by respective dielectrics 43, 47 (FIGS. 5 and 7) and ground planes 44, 46. FIG. 5 shows the top dielectric 43, and FIG. 7 shows the bottom dielectric 47, which have apertures 30, 40, 60, 70 to admit the feed posts 92, 98 connecting the connection points 52, 58 on the stripline assembly 45 to the respective antennas. The top dielectric 43 also has further apertures 31, 32 to admit the vias 81, 82 connecting the upper ground plane 44 to the upper patch antenna 42. Note that the number and location of vias will depend on the design frequency and the desired excitation mode. The bottom dielectric 47 may also have similar additional apertures if it is required to feed shorting vias or additional signal paths to the lower antenna 48 in order for it to also operate in higher modes In the embodiment of FIGS. 1 to 9 the top antenna has an omni-directional pattern in the azimuth plane, but it would be possible to design a lid with a radiation pattern that is directional in azimuth as well as elevation. This needs more careful alignment during installation of the lid, or by designing the cavity and lid to have no circular symmetry, so that they can only be aligned in one relative orientation—for example an irregular polygon, requiring a higher degree of customization. However, a more focused beam requires less power. FIG. 10 is a schematic illustrating such an arrangement, with a lid 14 containing a patch antenna repeater assembly. The lid is shaped as a non-regular polygon, depicted in FIG. 10 as a non-equilateral triangle. The repeater assembly has a beam pattern focused in a predetermined direction 15 relative to the apices of the polygon and a predetermined elevation 16 (see FIG. 11). Other irregular shapes having no circular symmetry, such as semi-circles, can be used.

The pit 11 to be covered by the lid is generally circular in cross section but has an annular cap element 12 with a polygonal aperture 13 shaped to accommodate the lid 14. Because of the shape of the aperture 13 and lid 14, the lid can only be inserted in one orientation. The dimensions of the aperture 13 and lid 14 are larger than the diameter of the bore of the pit 11 itself, so that the corners of the lid 14 can rest on abutments 16, 17, 18 at the lip of the pit.

When the cap 12 is first installed, it is aligned relative to the nearest base station so that when a complementary lid is inserted its antenna is focused on the base station. This arrangement makes replacement of damaged lids a relatively unskilled task, as the lid, and internal antenna assembly, can only be placed in one orientation relative to the base station. To ensure an antenna with the correct elevation angle is installed, lids with different elevation angles, and the complementary apertures, may be shaped differently for different elevations so that only a replacement lid with the appropriate antenna can be fitted.

The invention claimed is:

1. A pit lid for a pit, the pit lid comprising:
   a repeater antenna configured to re-transmit radio signals in and out of the pit having an aperture sized to accommodate the pit lid, the repeater antenna having an upper patch antenna and a lower patch antenna coupled through a stripline, the upper patch antenna the and lower patch antenna lying in planes substantially parallel to each other, the upper patch antenna having a radiation pattern concentrated in an upward direction at a predetermined angle from the plane of the upper patch antenna, and the lower patch antenna having a radiation pattern radiating in a downward direction to the plane of the lower patch antenna, and the lower patch antenna being tuned to dimensions of the pit such that the pit can act as a waveguide.

2. The pit lid according to claim 1, wherein the upper antenna is excited using modes higher than fundamental.

3. The pit lid according to claim 2, wherein the stripline is coupled to a ground plane and separated from the upper patch antenna by a dielectric, the dielectric having a plurality of apertures, and one or more via posts pass through the plurality of apertures to couple the ground plane to the upper patch antenna to induce the higher modes in the antenna.

4. The pit lid according to claim 1, wherein the radiation pattern of the upper patch antenna is azimuthally symmetrical.

5. The pit lid according to claim 1, wherein the pit lid has circular asymmetry, and the radiation pattern is configurable to be focused in a predetermined azimuth direction relative to the pit lid.

6. The pit lid according to claim 1, wherein the upper patch antenna is covered by a protective material having an unevenly shaped surface to deter placement of objects on the pit lid.

7. A set of the pit lids, each of the said pit lids being the pit lid according to claim 1, wherein the upper patch antenna of at least one pit lid of the set of pit lids has a radiation pattern concentrated in an upward direction at a first predetermined angle from the plane of the upper patch antenna, and wherein the upper patch antenna of at least one other pit lid has a radiation pattern concentrated in an upward direction at a second predetermined angle from the plane of the upper patch antenna.

8. A set of pit lids, each pit lid of the set of pit lids being according to claim 5, and at least one pit lid of the set of pit lids having a first external shape and having an upper patch antenna having a radiation pattern concentrated in an upward direction at a first predetermined angle from the plane of the upper patch antenna, and at least one other pit lid having a second external shape different from the first external shape, and having an upper patch antenna having a radiation pattern concentrated in an upward direction at a second predetermined angle from the plane of the upper patch antenna.

9. A method of installation of an antenna assembly for relaying radio signals between a radio station located in a pit and a radio base station remote from the pit, the method comprising:

covering the pit with a pit lid for the pit, the pit lid comprising a repeater antenna configured to re-transmit radio signals in and out of the pit having an aperture sized to accommodate the pit lid, the repeater antenna having an upper patch antenna and a lower patch antenna coupled through a stripline, the upper patch antenna the and lower patch antenna lying in planes substantially parallel to each other, the upper patch antenna having a radiation pattern concentrated in an upward direction at a predetermined angle from the plane of the upper patch antenna, and the lower patch antenna having a radiation pattern radiating in a downward direction to the plane of the lower patch antenna, and the lower patch antenna being tuned to dimensions of the pit such that the pit can act as a waveguide.

10. The method according to claim 9, wherein an angular elevation of the radio base station is measured from a position at a top aperture of the pit and, from a plurality of the pit lids, each of said plurality having radiation patterns concentrated at different predetermined elevation angles, selecting a pit lid having a radiation pattern corresponding to the angular elevation of the radio base station is selected for installation.

11. The method according to claim 9, wherein the pit lid has a circularly asymmetrical shape, and a top aperture of the pit has a corresponding shape, the pit lid having a transmission pattern focused in a predetermined direction relative to the shape of the pit lid, and the top aperture is oriented in a same predetermined direction with respect to the radio base station.

* * * * *